United States Patent [19]

Murphy

[11] Patent Number: 5,142,456
[45] Date of Patent: Aug. 25, 1992

[54] ILLUMINATED POINTER WITH AXIAL LIGHT SOURCE

[75] Inventor: Morgan D. Murphy, Kokomo, Ind.

[73] Assignee: Delco Electronics Corporation, Kokomo, Ind.

[21] Appl. No.: 703,938

[22] Filed: May 22, 1991

[51] Int. Cl.⁵ .............................................. G01D 11/28
[52] U.S. Cl. ..................................... 362/26; 362/23; 362/29; 116/288
[58] Field of Search .................. 362/23, 26, 28, 29, 362/30, 32; 116/288, 286, DIG. 56

[56] References Cited

U.S. PATENT DOCUMENTS

| | | | |
|---|---|---|---|
| 2,536,557 | 1/1951 | Levesque | 362/26 |
| 2,914,021 | 11/1959 | Blackwell et al. | 362/29 |
| 3,216,394 | 11/1965 | Blackwell | 362/32 |
| 3,590,233 | 6/1971 | Protzmann | 362/32 |
| 4,274,358 | 6/1981 | Nakamura et al. | 116/288 |
| 4,559,582 | 12/1985 | Scardilli et al. | 362/23 |
| 4,777,480 | 10/1988 | Okamoto et al. | 340/688 |
| 4,872,093 | 10/1989 | Shimizu | 362/26 |
| 4,951,177 | 8/1990 | Nishizaki et al. | 362/28 |
| 4,959,759 | 9/1990 | Kohler | 362/80 |
| 4,975,807 | 12/1990 | Ohashi | 362/26 |
| 5,047,761 | 9/1991 | Sell | 362/28 |
| 5,050,045 | 9/1991 | Kato et al. | 362/23 |

FOREIGN PATENT DOCUMENTS

| | | |
|---|---|---|
| 3036963C2 | 6/1982 | Fed. Rep. of Germany . |
| 3300271A1 | 7/1984 | Fed. Rep. of Germany . |
| 3347011A1 | 7/1985 | Fed. Rep. of Germany . |
| 3626957A1 | 2/1988 | Fed. Rep. of Germany . |
| 3824391A1 | 1/1990 | Fed. Rep. of Germany . |
| 732788 | 9/1932 | France ................................ 362/23 |

OTHER PUBLICATIONS

EP 0351259 A1, Rousseau.
EP 0180726 B1, Friepes.
EP 0110063 B1, Endler et al.
Abstracts of German and European publications.

Primary Examiner—Ira S. Lazarus
Assistant Examiner—Y. Quach
Attorney, Agent, or Firm—Anthony Luke Simon

[57] ABSTRACT

A transparent pointer for an indicating instrument has a light receiving surface centered on the axis of rotation of the pointer and a light bulb is positioned on the axis adjacent the light receiving surface to brightly illuminate the pointer at the same brightness for all pointer positions. A gage mechanism drives the pointer through a pointer support which is in part laterally offset from the axis to permit bulb location on the axis.

2 Claims, 1 Drawing Sheet

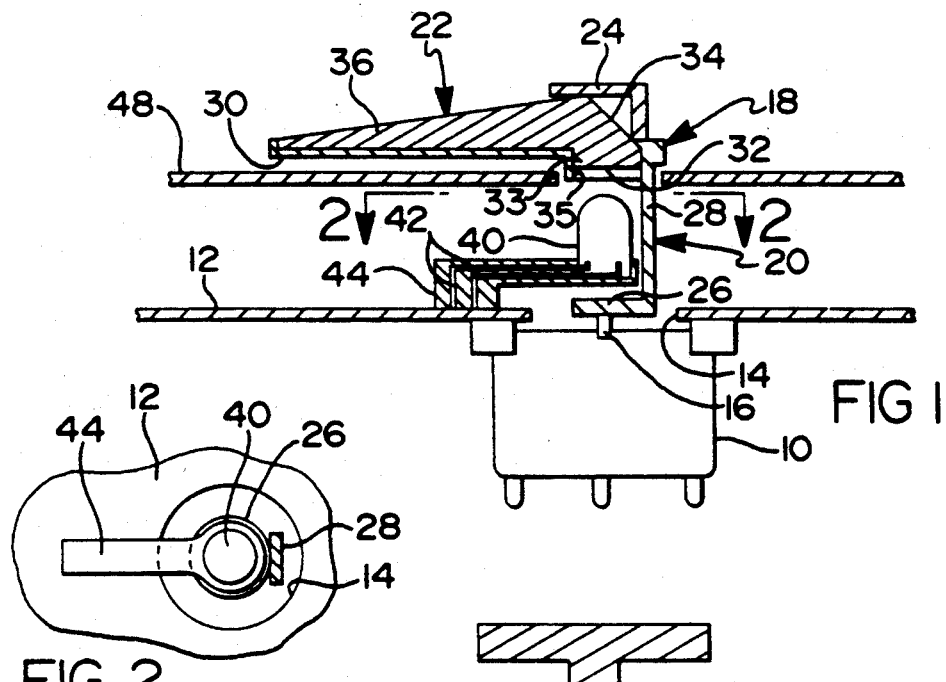
FIG 1
FIG 2
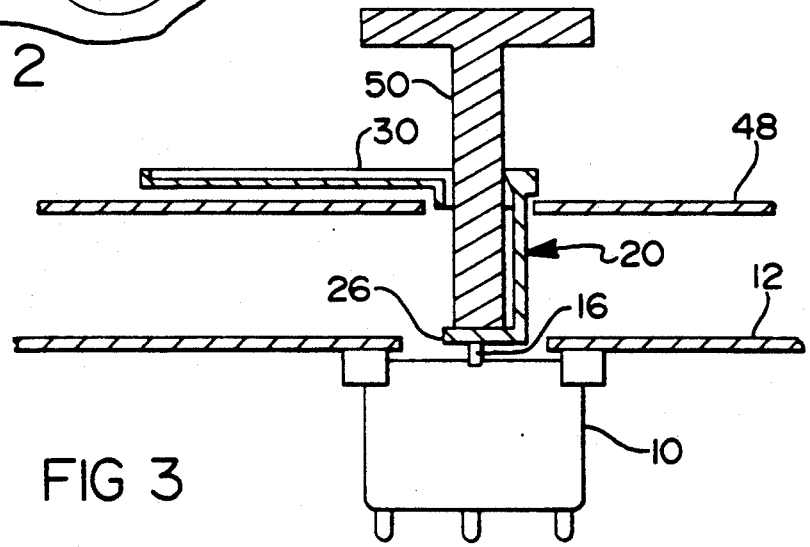
FIG 3
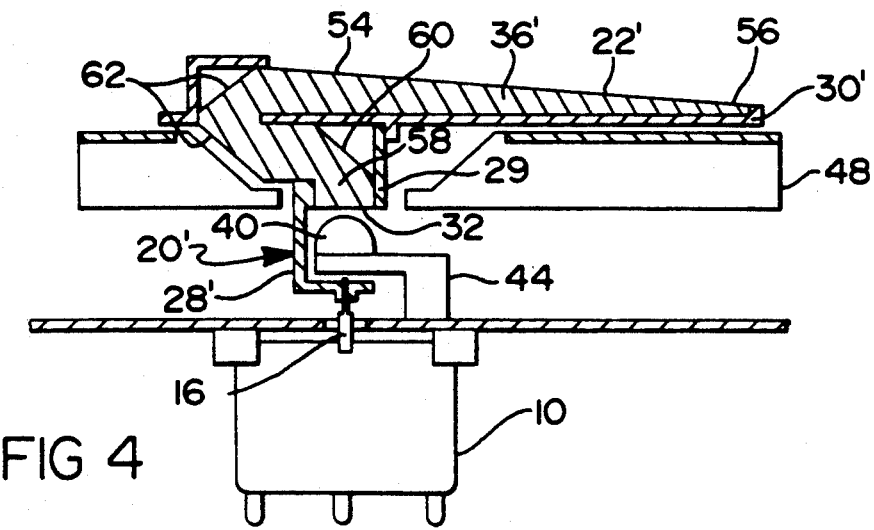
FIG 4

ILLUMINATED POINTER WITH AXIAL LIGHT SOURCE

The subject of this specification is related to the subject of copending U.S. patent application entitled "Lit Pointer for an Analog HUD Image Source," Ser. No. 07/630,621, filed Dec. 20, 1990, and assigned to the assignee of this application.

FIELD OF THE INVENTION

This invention relates to a gage having an illuminated pointer and particularly to such a gage which has bright illumination which is constant over the angular range of the pointer.

BACKGROUND OF THE INVENTION

It is well known to provide illumination of instrument pointers by incorporating a small lamp on a pointer or by using light conducting transparent pointer material optically coupled to a near-by light source. In the case of the small lamp on the pointer two problems arise: the expense of providing a lamp which is sufficiently small and sufficiently bright, and the reliability of the electrical leads to the lamp which must be flexible to allow free pointer motion.

In the case of light conduction schemes for pointer illumination it is the usual practice to transmit light from a remote lamp through more than one transparent element and into the pointer in such a manner that many reflections are required and that a very small portion of the source light enters the pointer, resulting in a low level of pointer illumination. It is also customary to couple light to a pointer, whether directly from a lamp or via a light conductor, through an off-axis surface of the pointer so that the light enters the pointer unsymmetrically and the pointer illumination then varies as the angular position changes. In many cases, the pointer illumination restricts the pointer movement to a small range.

It is desirable for a pleasing and useful display that the pointer illumination be sufficiently bright and that the brightness should not change during the pointer movement. In some applications a display is covered by a dark lens so that pointers are concealed from view when not in use and are revealed when illuminated. There a bright pointer is required to show through the dark lens. Gage design also often requires a large pointer movement angle.

SUMMARY OF THE INVENTION

It is therefore an object of the invention to provide pointer illumination which offers bright illumination as well as a light level which is independent of pointer angular position. It is a further object to provide such illumination which also allows a wide angle of pointer range.

The invention is carried out by means for illuminating a pointer of an indicating instrument comprising: a pointer of light conducting material; means for mounting the pointer for rotation about an axis; a light receiving surface on the pointer centered on the axis; a light source on the axis adjacent the light receiving surface for directly illuminating the pointer in a region symmetrical with the axis whereby the pointer illumination is independent of the pointer angular position; and gage means coupled to the mounting means for driving the pointer about the axis.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a cross-sectional elevation of a gage and pointer assembly according to the invention;

FIG. 2 is a cross-sectional view of the assembly of FIG. 1 taken along line 2—2;

FIG. 3 is a cross-sectional elevation of a portion of the assembly of FIG. 1 illustrating the use of an assembly tool; and FIG. 4 is a cross-sectional elevation of a gage and pointer assembly according to another embodiment of the invention.

DESCRIPTION OF THE INVENTION

Referring to FIGS. 1 and 2, a gage mechanism 10 is suspended from a printed circuit board 12 or other panel containing an aperture 14. The gage includes a shaft 16 aligned with the aperture 14 for driving a pointer assembly 18 and thereby defining an axis of pointer rotation. The pointer assembly includes a pointer support 20, a pointer 22 carried by the support 20, and a cap 24. The pointer support 20 comprises a unitary molding which has a base 26 shown here as generally circular but having any convenient shape and which is staked to the shaft 16 for driving engagement by the shaft. An off-axis spacer 28 extends from one side of the base 26 parallel to and spaced from the axis of pointer rotation and holds a mount 30 which securely retains the pointer 22.

The pointer 22 is made of a transparent material suitable for conducting light by internal reflections. It has a lower light receiving surface 32 facing in the direction of the base 26, an upper 45° angled light reflecting surface 34 opposite the receiving surface 32, and an elongated pointer finger 36 which is tapered in a well known manner to emit light uniformly along the length of the pointer. The cap 24 covers the upper angled surface 34 to contain any light which leaks through the pointer in that area. The cap 24 may be molded integrally with the pointer support 20 and attached thereto by a living hinge which allows the cap to be moved out of the way during assembly The pointer also has a cylindrical lower boss 33 containing the receiving surface 32 and which snugly nests within a cylindrical sleeve 35 formed in the mount 30.

Since the spacer 28 is laterally spaced from the axis of rotation, the region between the base 26 and the lower light receiving surface 32 is unobstructed by the pointer driving mechanism and thus allows a light source 40 such as a light bulb to be mounted directly on the axis of rotation and adjacent the light receiving surface. Then the light from the source 40 enters the pointer 22 and travels to the pointer finger 36 in the same way for any angular position of the pointer, resulting in uniform brightness throughout the range of movement. The placement of the light source directly adjacent the pointer also results in very efficient light coupling into the light receiving surface so that a high level of brightness ca readily be achieved. The bulb 40 and electrical leads 42 to the bulb are mounted on a support 44 which is carried by the printed circuit board 12 which provides circuit connections (not shown) to the leads 42. As shown in FIG. 2, both the support 44 and the spacer 28 are narrow and thus subtend a small angle, say 40° each, of the pointer axis so that the pointer can move throughout a wide angle, on the order of 280°. The support 44 and spacer 28 may, in fact, be designed to function as the pointer stops.

When assembled, the pointer is closely spaced above a facia plate 48 which normally carries indicia (not shown) of the quantity being measured. The assembly of the instrument is facilitated, as shown in FIG. 3, by staking the pointer support 20, with the cap 24 removed to the gage shaft 16 by a stake rod 50. The pointer is aligned with the indicia and the stake rod 50 is inserted through the cylindrical sleeve 35 of the mount 30 to bear directly against the base 26 and press the base onto the shaft. Then the light source 40 and support 44 are placed on the circuit board 12, the pointer 22 is adhesively secured to the mount 30 and the cap 24 is installed.

FIG. 4 shows a longer style of pointer 22' which has a pointer finger 36' which extends across the axis of rotation. The finger 36' has a wide proximal end 54 near the axis and a narrow distal end 56 remote from the axis. An integral base 58 attached to the proximal end below the finger 36' extends parallel to the finger to the axis and then down to terminate in a light receiving surface 32 which is centered on the axis and near a light source 40 which is also on the axis. A pointer support 20' mounted on the shaft 16 has a spacer 28' adjacent the light source and offset from the axis and an upper hollow member 29 which holds the pointer base 58 and a mount 30'. The base 58 includes a first reflecting surface 60 on the axis at a 45° angle to the axis to reflect light toward the proximal end 54 where a pair of 45° reflecting surfaces 62 reflect the light 180° from the base 58 into the pointer finger 36'. As in the above-described embodiment, the pointer illumination is the same for all pointer angles due to the axial symmetry of the light receiving surface and the light source. The mount 30' is painted to provide the required light dispersion. The cap 24 covers the upper angle surface 62 to block light leakage from the reflector surface.

It will thus be seen that the invention employs a simple structure to achieve a significant benefit. It allows a light source to be placed at the optimum position to illuminate a light conducting pointer. While it is preferred that the light source adjacent the light receiving surface be a bulb or other electrical device such as a light emitting diode, a remote electrical device may be optically coupled to the light receiving surface of the pointer such as by a light conductor or by mirrors. In that event the light must be efficiently coupled to the pointer to attain the necessary brightness and the light entry to the pointer must be along the axis of rotation to simulate a bulb on the axis to assure the same illumination for all pointer positions.

The embodiments of the invention in which an exclusive property or privilege is claimed are defined as follows:

1. An illuminated indicator for a gauge having consistent brightness at all rotary pointer positions comprising:

pointer support means for rotation about an axis;
   a transparent pointer mounted on the pointer support means for rotary movement therewith about the axis and having an axially located light receiving surface;
   gage means for driving the pointer support means and the pointer about the said axis;
   the pointer support means including a base member for attachment to the gage means, a pointer support member for attachment to the pointer and a spacer member laterally spaced from the axis and connecting the support member to the base member for defining an axial space between the gage means and the light receiving surface;
   an axially positioned light source in the said axial space adjacent the light receiving surface for illuminating the pointer, whereby the light is directly transmitted to the pointer and the pointer illumination is independent of pointer angular position; and
   light support means extending into the axial space for supporting the light source, wherein the light support means and the spacer member interfere to limit the pointer rotation and each have small angular dimension to allow side angle pointer movement.

2. An indicating instrument with an illuminating pointer, comprising:

a pointer of light conducting material, including a proximal end and a distal end on opposite sides of a pointer axis, a light receiving surface on the pointer axis, a first reflecting surface on the pointer axis at an angle to the pointer axis to reflect light toward the proximal end and second and third reflecting surfaces at the proximal end of the pointer to reflect the light toward the distal end into a pointer finger;
   means for mounting the pointer for rotation about the pointer axis;
   a light source on the pointer axis adjacent the light receiving surface for directly illuminating the pointer in a region symmetrical with the pointer axis whereby the pointer illumination is independent of an angular position of the pointer; and
   gage means coupled to the mounting means for driving the pointer about the pointer axis.

* * * * *